United States Patent
Kurian et al.

(10) Patent No.: US 10,140,470 B2
(45) Date of Patent: Nov. 27, 2018

(54) SYSTEM FOR EXTERNAL VALIDATION OF DISTRIBUTED RESOURCE STATUS

(71) Applicant: Bank of America Corporation, Charlotte, NC (US)

(72) Inventors: Manu Jacob Kurian, Dallas, TX (US); Darrell Johnsrud, Camas, WA (US)

(73) Assignee: Bank of America Corporation, Charlotte, NC (US)

( * ) Notice: Subject to any disclaimer, the term of this patent is extended or adjusted under 35 U.S.C. 154(b) by 349 days.

(21) Appl. No.: 15/049,852

(22) Filed: Feb. 22, 2016

(65) Prior Publication Data
US 2017/0243025 A1 Aug. 24, 2017

(51) Int. Cl.
| | |
|---|---|
| *G06F 21/62* | (2013.01) |
| *G06Q 40/00* | (2012.01) |
| *H04L 29/06* | (2006.01) |
| *H04L 9/32* | (2006.01) |

(52) U.S. Cl.
CPC ......... *G06F 21/6245* (2013.01); *G06Q 40/00* (2013.01); *H04L 9/3236* (2013.01); *H04L 63/102* (2013.01); *H04L 2209/38* (2013.01); *H04L 2209/56* (2013.01); *H04L 2463/102* (2013.01)

(58) Field of Classification Search
CPC ..... G06F 21/6245; G06Q 40/00; H04L 63/08; H04L 63/102
See application file for complete search history.

(56) References Cited

U.S. PATENT DOCUMENTS

| | | | |
|---|---|---|---|
| 5,671,283 | A | 9/1997 | Michener et al. |
| 5,835,599 | A | 11/1998 | Buer |
| 6,073,234 | A | 6/2000 | Kigo et al. |
| 6,324,286 | B1 | 11/2001 | Lai et al. |

(Continued)

FOREIGN PATENT DOCUMENTS

| | | |
|---|---|---|
| WO | WO 2014162296 | 10/2014 |
| WO | WO 2015135018 | 9/2015 |

OTHER PUBLICATIONS

Bradley Hope et al., "A Bitcoin Technology Gets Nasdaq Test"; May 10, 2015; retrieved from http://www.wsj.com/articles/a-bitcoin-technology-gets-nasdaq-test-1431296886.

(Continued)

*Primary Examiner* — Noura Zoubair
(74) *Attorney, Agent, or Firm* — Michael A. Springs; Moore & Van Allen PLLC; Peter B. Stewart

(57) ABSTRACT

Embodiments of the invention are directed to a system, method, or computer program product for generating and using a block chain distributed network for tracking and validating the status of distributed portions of a finite resource and the obligations of users to return portions of the finite resource. In example implementations, the block chain database comprises a distributed ledger that is updated to reflect the status and availability of particular portions of the finite resource, including the fractional return of resource portions by users to whom such portion had previously been assigned. Example implementations also implement the use of queries to the block chain to validate requests for access to particular portions of a finite resource, determine the availability of the portion and verify the satisfaction of resource-return obligations incurred by users.

18 Claims, 5 Drawing Sheets

(56) References Cited

U.S. PATENT DOCUMENTS

| | | | |
|---|---|---|---|
| 6,725,303 B1 | 4/2004 | Hoguta et al. | |
| 6,850,252 B1 | 2/2005 | Hoffberg | |
| 6,973,187 B2 | 12/2005 | Gligor et al. | |
| 7,055,039 B2 | 5/2006 | Chavanne et al. | |
| 7,092,400 B2 | 8/2006 | Malzahn | |
| 7,184,549 B2 | 2/2007 | Sorimachi et al. | |
| 7,362,859 B1 | 4/2008 | Robertson et al. | |
| 7,392,384 B2 | 6/2008 | Hopkins et al. | |
| 7,428,306 B2 | 9/2008 | Celikkan et al. | |
| 7,502,933 B2 | 3/2009 | Jakobsson et al. | |
| 7,574,401 B1 | 8/2009 | Burns | |
| 7,649,992 B2 | 1/2010 | Raju et al. | |
| 7,764,788 B2 | 7/2010 | Tardo | |
| 7,979,889 B2 | 7/2011 | Gladstone et al. | |
| 8,078,874 B2 | 12/2011 | You et al. | |
| 8,107,621 B2 | 1/2012 | Celikkan et al. | |
| 8,155,311 B2 | 4/2012 | Shin et al. | |
| 8,259,934 B2 | 9/2012 | Karroumi et al. | |
| 8,358,781 B2 | 1/2013 | Schneider | |
| 8,397,841 B1 | 2/2013 | Taylor et al. | |
| 8,396,209 B2 | 3/2013 | Schneider | |
| 8,416,947 B2 | 4/2013 | Schneider | |
| 8,458,461 B2 | 6/2013 | Tardo | |
| 8,464,320 B2 | 6/2013 | Archer et al. | |
| 8,516,266 B2 | 8/2013 | Hoffberg et al. | |
| 8,590,055 B2 | 11/2013 | Yoon et al. | |
| 8,737,606 B2 | 5/2014 | Taylor et al. | |
| 8,942,374 B2 | 1/2015 | Fujisaki | |
| 8,983,063 B1 | 3/2015 | Taylor et al. | |
| 9,059,866 B2 | 6/2015 | Bar-Sade et al. | |
| 9,083,702 B2 | 7/2015 | Wied et al. | |
| 9,092,766 B1 | 7/2015 | Bedier et al. | |
| 9,298,806 B1 | 3/2016 | Vessenes et al. | |
| 9,635,000 B1 | 4/2017 | Muftic | |
| 9,672,499 B2 | 6/2017 | Yang et al. | |
| 2003/0126094 A1 | 7/2003 | Fisher et al. | |
| 2004/0172535 A1 | 9/2004 | Jakobsson et al. | |
| 2005/0256802 A1 | 11/2005 | Ammermann et al. | |
| 2008/0215500 A1* | 9/2008 | De La Motte | G06Q 40/00 705/36 R |
| 2009/0281948 A1 | 11/2009 | Carlson | |
| 2010/0279653 A1 | 11/2010 | Poltorak | |
| 2011/0078073 A1 | 3/2011 | Annappindi | |
| 2011/0197064 A1 | 8/2011 | Garcia Morchon et al. | |
| 2012/0066121 A1 | 3/2012 | Shahbazi et al. | |
| 2012/0284175 A1 | 11/2012 | Wilson et al. | |
| 2013/0198061 A1 | 8/2013 | Cheer et al. | |
| 2013/0232056 A1 | 9/2013 | Schulman | |
| 2014/0006185 A1 | 1/2014 | Zurn et al. | |
| 2014/0089243 A1 | 3/2014 | Oppenheimer | |
| 2014/0310171 A1 | 10/2014 | Grossman et al. | |
| 2015/0172053 A1 | 6/2015 | Schwarz et al. | |
| 2015/0206106 A1 | 7/2015 | Yago | |
| 2015/0332283 A1 | 11/2015 | Witchey | |
| 2015/0379510 A1 | 12/2015 | Smith | |
| 2015/0379636 A1 | 12/2015 | Szabo et al. | |
| 2016/0012424 A1 | 1/2016 | Simon et al. | |
| 2016/0028552 A1 | 1/2016 | Spanos et al. | |
| 2016/0050203 A1 | 2/2016 | Hefetz | |
| 2016/0092874 A1 | 3/2016 | O'Regan et al. | |
| 2016/0125376 A1 | 5/2016 | Beatty et al. | |
| 2016/0191243 A1 | 6/2016 | Manning | |
| 2016/0275461 A1 | 9/2016 | Sprague et al. | |
| 2016/0292672 A1 | 10/2016 | Fay et al. | |
| 2016/0321654 A1 | 11/2016 | Lesavich et al. | |
| 2016/0321752 A1* | 11/2016 | Tabacco | G06Q 40/04 |
| 2016/0323109 A1 | 11/2016 | McCoy et al. | |
| 2016/0342978 A1 | 11/2016 | Davis et al. | |
| 2016/0342989 A1 | 11/2016 | Davis | |
| 2016/0342994 A1 | 11/2016 | Davis | |
| 2017/0005804 A1 | 1/2017 | Zinder | |
| 2017/0046526 A1 | 2/2017 | Chan et al. | |
| 2017/0046652 A1 | 2/2017 | Haldenby et al. | |
| 2017/0046664 A1 | 2/2017 | Haldenby et al. | |
| 2017/0046680 A1 | 2/2017 | Crites | |
| 2017/0091397 A1 | 3/2017 | Shah | |
| 2017/0103167 A1 | 4/2017 | Shah | |
| 2017/0103385 A1* | 4/2017 | Wilson, Jr. | G06Q 20/401 |
| 2017/0103461 A1 | 4/2017 | Acuña-Rohter et al. | |
| 2017/0116693 A1 | 4/2017 | Rae et al. | |
| 2017/0132625 A1 | 5/2017 | Kennedy | |
| 2017/0132626 A1 | 5/2017 | Kennedy | |
| 2017/0132630 A1 | 5/2017 | Castinado et al. | |
| 2017/0140375 A1 | 5/2017 | Kunstel | |
| 2017/0163733 A1 | 6/2017 | Grefen et al. | |
| 2017/0177855 A1 | 6/2017 | Costa Faidella et al. | |
| 2017/0178131 A1 | 6/2017 | Fernandez et al. | |
| 2017/0178237 A1 | 6/2017 | Wong | |
| 2017/0180134 A1 | 6/2017 | King | |
| 2017/0200137 A1 | 7/2017 | Vilmont | |
| 2017/0213209 A1 | 7/2017 | Dillenberger | |
| 2017/0214675 A1 | 7/2017 | Johnsrud et al. | |
| 2017/0214698 A1 | 7/2017 | Hughes et al. | |
| 2017/0220998 A1 | 8/2017 | Horn et al. | |
| 2017/0221052 A1 | 8/2017 | Sheng et al. | |
| 2017/0223005 A1 | 8/2017 | Birgisson et al. | |
| 2017/0228447 A1 | 8/2017 | Catania et al. | |
| 2017/0230378 A1 | 8/2017 | Bliss | |
| 2017/0232300 A1 | 8/2017 | Tran et al. | |
| 2017/0235955 A1 | 8/2017 | Barkan | |
| 2017/0236407 A1 | 8/2017 | Rhoads et al. | |
| 2017/0243020 A1 | 8/2017 | Dhondse et al. | |

OTHER PUBLICATIONS

Nathaniel Popper, "Bitcoin Technology Piques Interest on Wall Street"; Aug. 28, 2015 retrieved from http:// www.nytimes.com/2015/08/31/business/dealbook/bitcoin-techno, Aug. 31, 2015.

Joseph C. Guagliardo et al., "Blockchain: Preparing for Disruption Like It's the '90s"; Mar. 14, 2016, retrieved from http://www.law360.com/articles/77120CVprint?section=ip.

Robert Mcmillian, "IBM Bets on Bitcoin Ledger"; Feb. 16, 2016, retrieved from http://www.wsj.com/articles/ibm-bets-on-bitcoin-ledger-1455598864.

Richard Lee Twesige, "A simple explanation of Bitcoin and Blockchain technology"; Jan. 2015, retrieved from http://www.researchgate.net/profile/Richard_Twesige/publication/270287317_Bitcoin_A_simple_explanation_of_Bitcoin_and_Block_Chain_technology_JANUARY_2015_RICHARD_LEE_TWESIGE/links/54a7836f0cf267bdb90a0ee6.pdf.

Tasca. "Digital Currencies: Principles, Treads, Opportunities, and Risks," Treads, Opportunities, and Risks. Sep. 7, 2015 (Sep. 7, 2015); Retrieved from https://www.researchgate.net/profile/Paolo_Tasca/publication/290805276_Digital_Currencies_Principles_Trends_Opportunities_and_Risks/Links569bb91e)8ae6169e562552.pif, p. 1, 5, 10, 12, 14.

Lerner. "Mavepay, A New Lightweight Payment Scheme for Peer to Peer Currency Networks." Apr. 17, 2012 ((Apr. 17, 2012) Retrieved from <https://pdfs.semamicscholar.org/1185/a26f014678b959876519065c2624458d75b8.pdf>. Entire Document.

PCT International Searching Authority; International Search Report and Written Opinion for PCT/US2016/061402 dated Dec. 27, 2016.

Malahov, Yanislav Georgiev, "BitAlias 1, Aka Usernames for Bitcoin, A New, Simple Naming System for Bitcoin Addresses", retrieved from https://medium.com/bitalias-decentralized-naming-and-identity-service-bitalias-7b66bffe9d8 on Mar. 12, 2017; Bringing Crypto to the People to the People, Founder of www.aeternity.com, Jun. 6, 2015, 6 pages.

PCT International Searching Authority; Written Opinion for PCT/IB16/01655 completed Mar. 11, 2017, 8 pages.

PCT International Searching Authority; International Search Report for PCT/IB16/01655 completed Mar. 12, 2017, 4 pages.

Buterin, Vitalik, "On Public and Private Blockchains", Aug. 7, 2015, https://blog.ethereum.org/2015/08/07/on-public-and-private-blockchains/.

* cited by examiner

SYSTEM FOR EXTERNAL VALIDATION OF DISTRIBUTED RESOURCE STATUS

BACKGROUND

The need for a given resource is often characterized by a temporal characteristic and a scalar characteristic, in the sense that a need for a limited, finite portion of a particular resource may arise at a particular time and last for a finite duration of time, after which the resource can be returned and reissued to another user or reapportioned and shared amongst a collection of other users, whose individual needs (which are limited in scale and time on an individual basis) can be aggregated to a scale that permits and implicates the creation and efficient distribution of a sharable, divisible resource. The recognition of the temporal and scalar aspect of resource allocation has given rise to the use of resource allocation structures that allow for portions of a shared resource to be temporarily assigned to user, who becomes responsible for returning the portion of the shared resource after a prescribed period of time.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing an innovative system, method and computer program product for the external validation of the status of a distributed resource via a block chain database.

In some embodiments, a block chain database is used to verify and track in a distributed ledger the availability of one or more portions of a divisible resource that can be distributed amongst a plurality of users. When a user requests a portion of a resource and is assigned the requested portion, the user incurs the obligation to return the resource in accordance with the rules governing the resource, such as, for example, the passage of a predetermined period of time. In contexts where the resource is highly divisible, the block chain database can be used to track the return of portions of the requested resource and document the partial satisfaction of the user's obligation to return the resource.

In situations where a finite resource can be divided and distributed readily and rapidly amongst a plurality of users, the effective and accurate tracking of the location of each portion of the resource, the return of portions and partial portions of the resource, and the status of users associated with any obligations to return resources is essential to the efficient use and sharing of the resource. Using a block chain database to implement a distributed ledger allows for tracking of resource allocations and obligations to return resource portions in a manner that can be quickly and externally validated such that individualized errors that may occur in one part of the distributed ledger can be detected and corrected without propagation throughout the database in a manner that impedes the efficient distribution of a resource.

Embodiments of the invention relate to systems, methods, and computer program products for externally validating the status of a distributed resource, the invention comprising: recognizing a finite divisible resource associated with a plurality of users; identifying a first portion of the divisible resource to be assigned to a first user from among the plurality of users; transmitting to a distributed ledger an indication that the first portion of the divisible resource is to be assigned to the first user; receiving from the distributed ledger an indication that the first portion of the divisible resource is available to be assigned to the first user; transmitting to the first user the first portion of the finite divisible resource; receiving from the first user an indicator of an obligation to return the first portion of the finite divisible resource; transmitting to the distributed ledger a record associated with the first user, the first portion of the finite divisible resource, and the obligation to return the first portion; and receiving from the distributed ledger an indication that the distributed ledger had been updated to reflect the transmission of the first portion of the finite divisible resource to the first user and the obligation to return the first portion.

In some example implementations, the distributed ledger is associated with a block chain distributed network. In some such example implementations, and in other example implementations, the finite divisible resource is a pool of loanable funds.

In some example implementations, the invention further comprises receiving from a second user from among the plurality of users a request for the first portion of the finite divisible resource; transmitting to the distributed ledger an indication that the second user has requested that the first portion of the divisible resource be assigned to the second user; receiving from the distributed ledger an indication that the first portion of the divisible resource is unavailable to be assigned to the second user; and rejecting the request from the second user for the first portion of the finite divisible resource.

In some such example implementations, and in other example implementations, the invention further comprises receiving an indication that the first user has assigned the first portion of the finite divisible resource to a second user from among the plurality of the users; receiving an indication of an obligation by the second user to return the first portion of the finite divisible resource; transmitting to the distributed ledger a record associated with the second user, the first portion of the finite divisible resource, and the obligation to return the first portion; and receiving from the distributed ledger an indication that the distributed ledger had been updated to reflect the transmission of the first portion of the finite divisible resource to the second user and the obligation by the second user to return the first portion.

In some example implementations, the invention further comprises receiving an indication that the first user has satisfied the obligation to return the first portion of the finite divisible resource; receiving a confirmation that the first portion of the finite divisible resource has been returned; transmitting to the distributed ledger an indication that the first user has satisfied the obligation and that the first portion has been returned; receiving from the distributed ledger an indication that the distributed ledger has been updated to reflect the satisfaction of the obligation and the return of the first portion of the finite divisible resource; and receiving from the distributed ledger an indication that the first portion of the finite divisible resource is available for redistribution.

In some example implementations of the invention, identifying a first portion of the divisible resource to be assigned to a first user from among the plurality of users comprises receiving an indication of authorization from a representative of the plurality of users.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
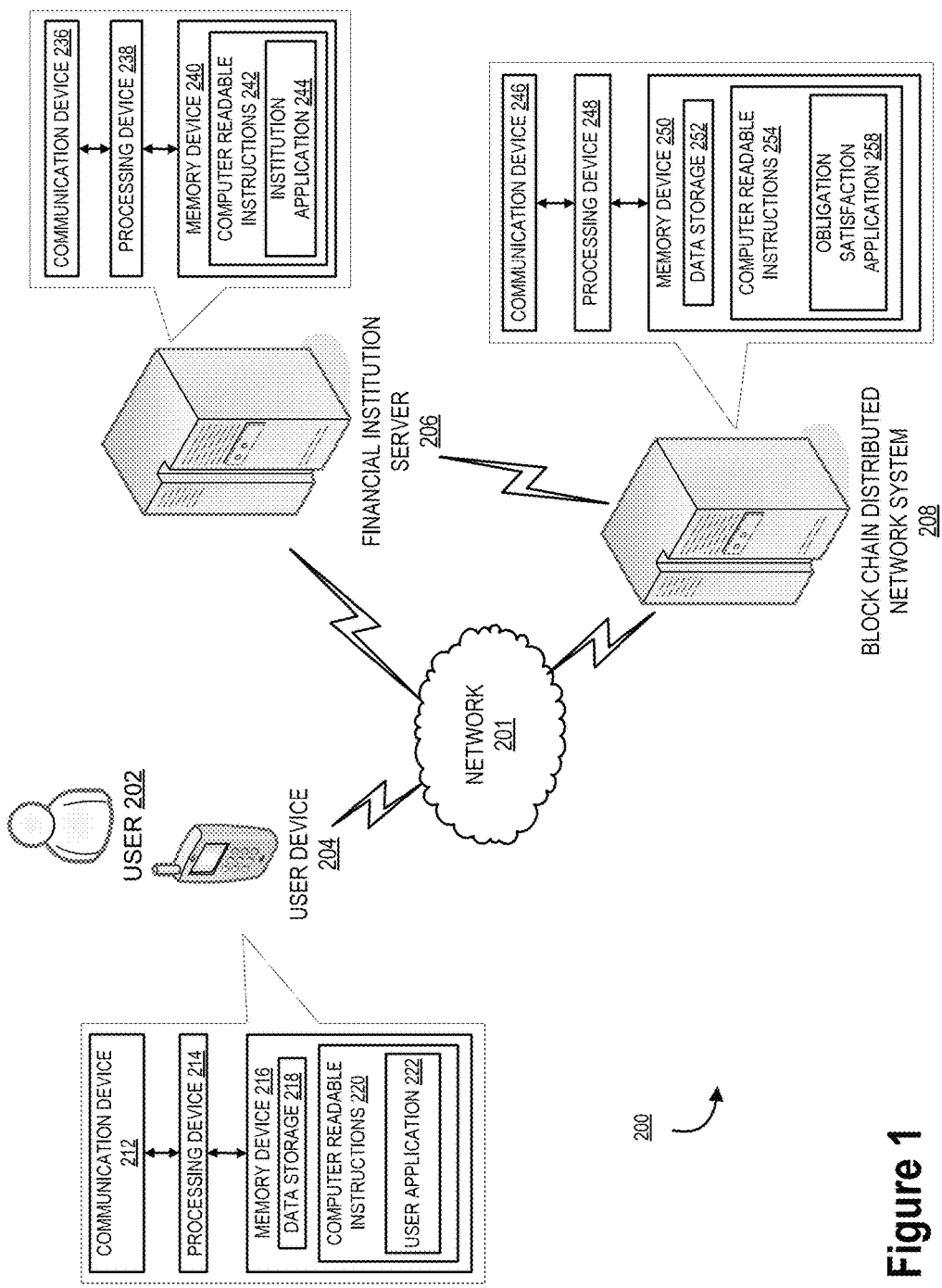
Figure 2A:
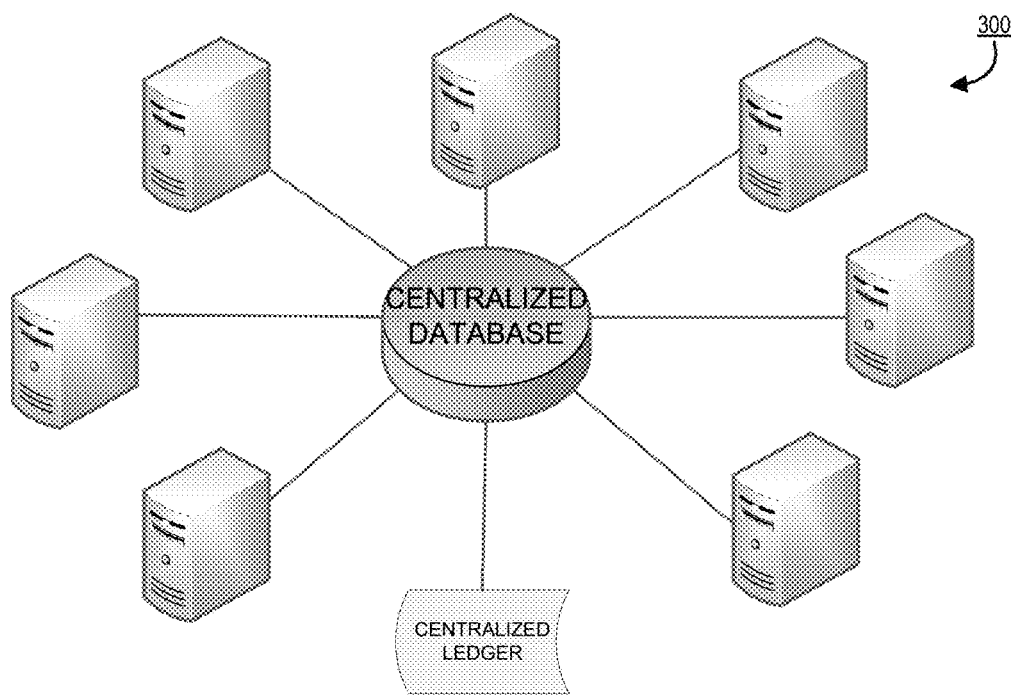
Figure 2B:
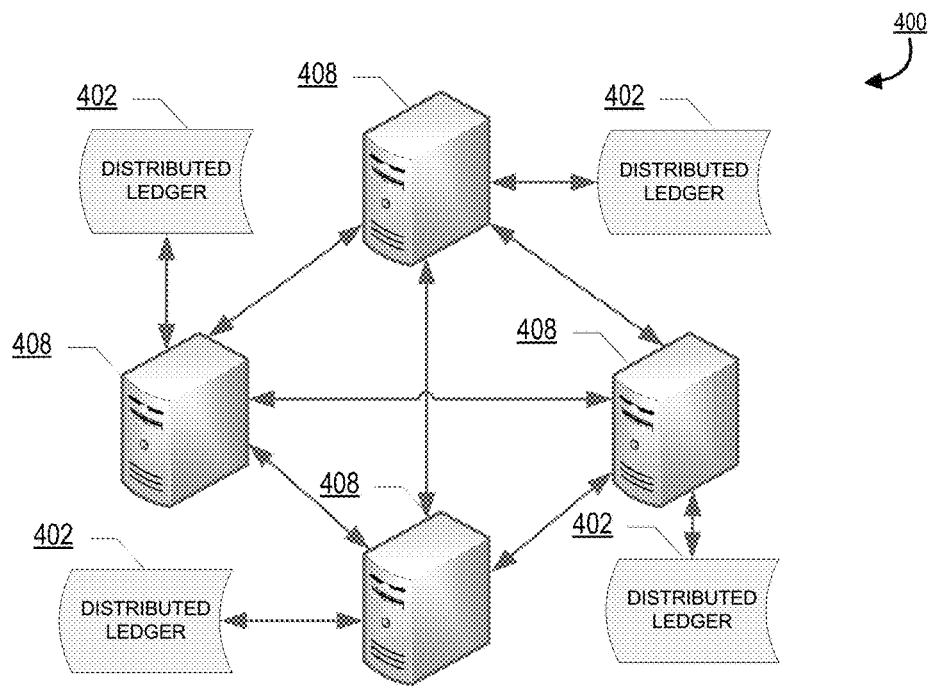
Figure 3:
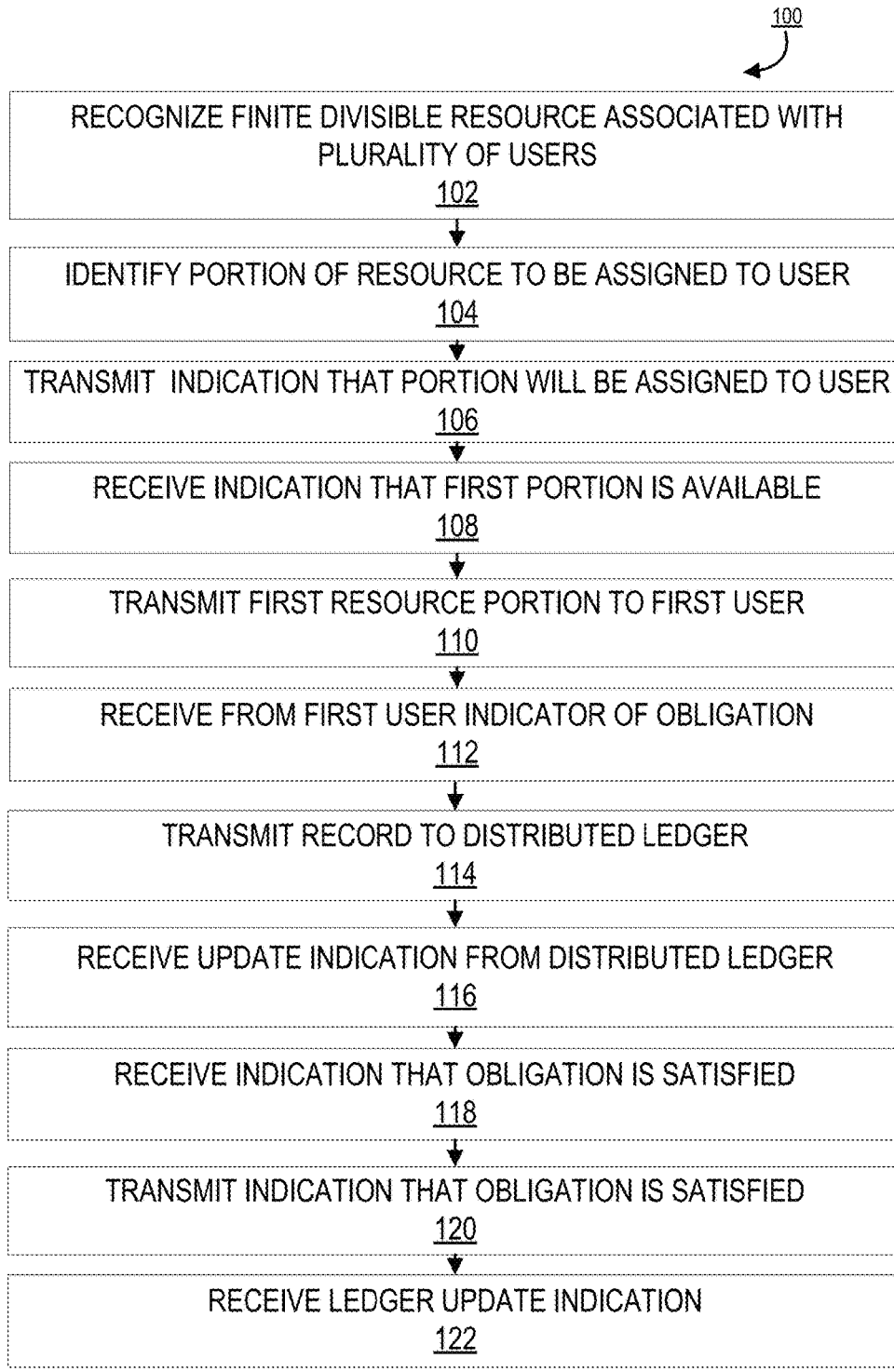
Figure 4:
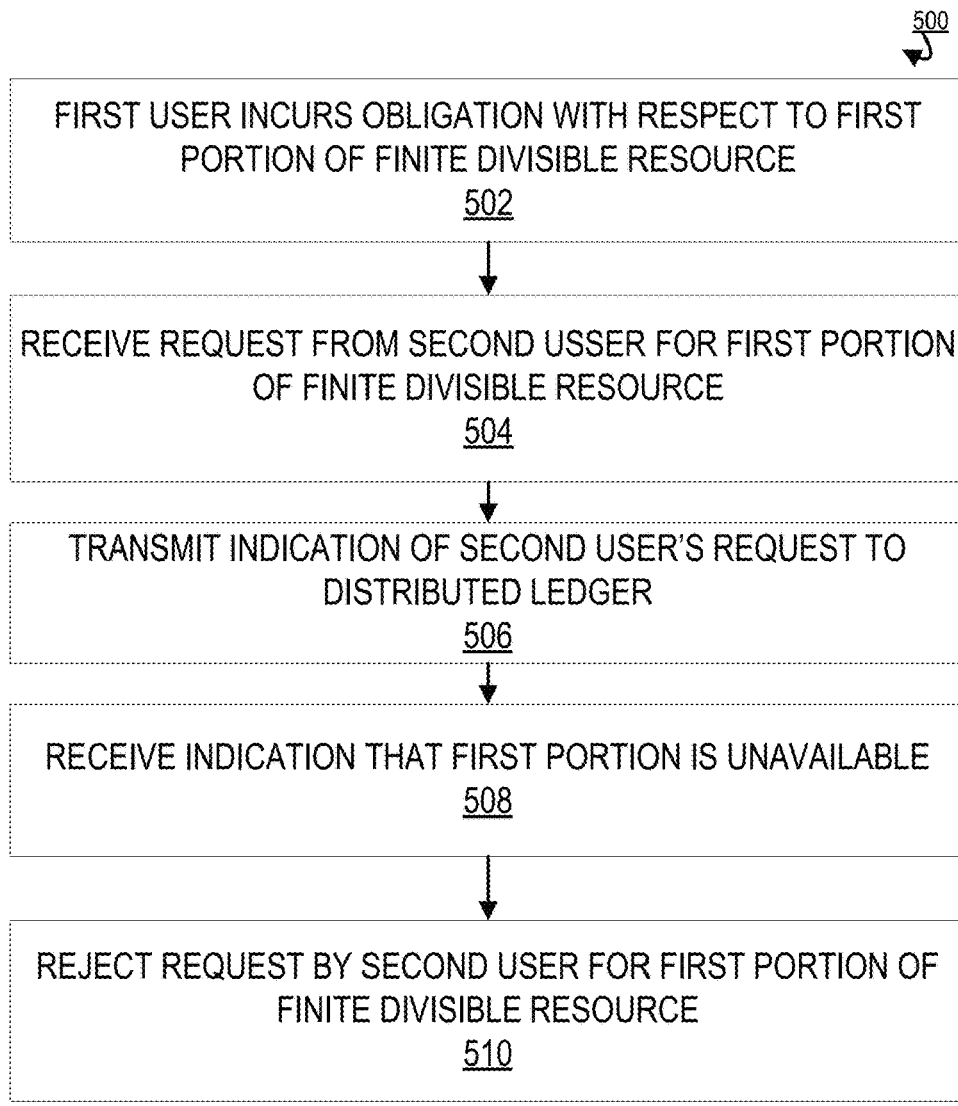
Figure 5:
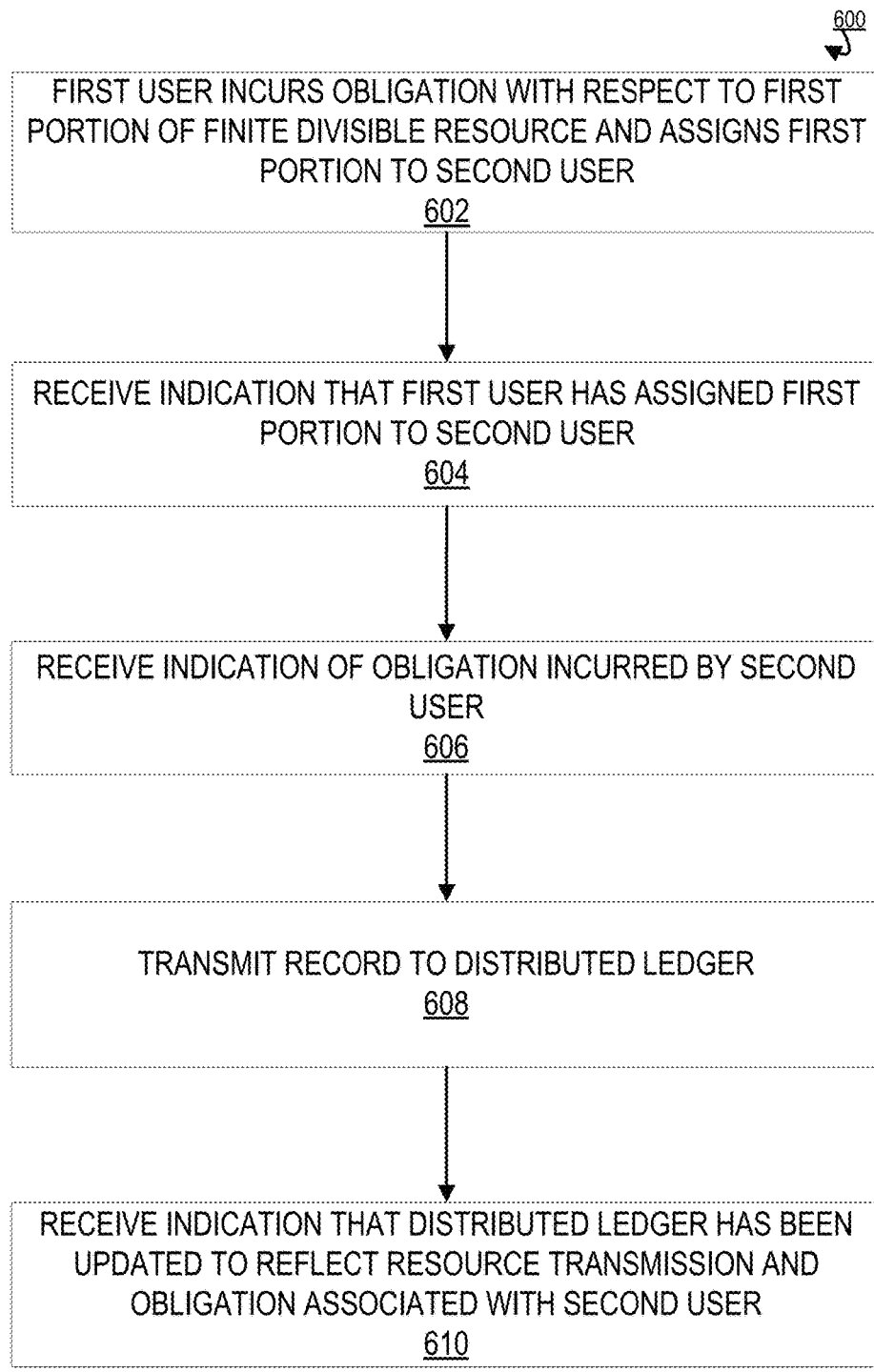

Having thus described embodiments of the invention in general terms, reference will now be made to the accompanying drawings, wherein:

FIG. 1 provides a block chain identification system environment, in accordance with one embodiment of the present invention;

FIG. 2A provides centralized database architecture environment, in accordance with one embodiment of the present invention;

FIG. 2B provides a block chain system environment architecture, in accordance with one embodiment of the present invention;

FIG. 3 provides a high level process flow illustrating a block chain resource distribution and obligation satisfaction process, in accordance with one embodiment of the present invention;

FIG. 4 provides a process flow illustrating a block chain obligation verification and resource distribution process, in accordance with one embodiment of the present invention; and FIG. 5 provides a process flow illustrating an obligation and resource transfer process, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

A "user", as referenced herein, may refer to an entity or individual that has the ability and/or authorization to access and use one or more portions of a divisible resource, such as a shared divisible resource. Furthermore, as used herein, the term "user device" or "mobile device" may refer to mobile phones, personal computing devices, tablet computers, wearable devices, and/or any portable electronic device capable of receiving and/or storing data therein.

An "account" is the relationship that a user has with an entity or another entity, such as a financial institution. Examples of accounts include a deposit account, such as a transactional account (e.g., a banking account), a savings account, an investment account, a money market account, a time deposit, a demand deposit, a pre-paid account, a credit account, a non-monetary user profile that includes information associated with the user, or the like. The account is associated with and/or maintained by the entity.

A "resource" includes accounts and/or other property available to the user. Example implementations contemplate a divisible and/or sharable resource, such as a pool of funds that can be distributed amongst a plurality of users. In such example implementations, the resource is highly divisible in the sense that most currency systems contemplate and recognize small fractional divisions of currency units. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. Examples of resources that may not necessarily be associated with accounts may be particularized goods, such as distinct pieces of furniture, equipment, or other valuables, or the like. Similarly, "funds" or "available balance" refer to types of resources. For example, the funds may refer to a pool of monetary resources available to a set or subset of users, and may also be referred to as an available balance, a collected balance, good funds, and usable funds.

In the context of example implementations described herein, a "transaction" or "resource distribution" refers to any transfer of resources and/or an obligation to return resources to and/or from a user. Alternatively, in some embodiments, the term "transaction" may be used when describing the block chain database as a transaction type of record. The transaction type records consists of the actual data stored in the block chain. A transaction may refer to a purchase of goods or services, a return of goods or services, a payment transaction, a credit transaction, or other interaction involving a user's account. In the context of a financial institution, a transaction may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that is detectable by the financial institution. A transaction may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like.

Embodiments of the present invention address the above needs and/or achieve other advantages by providing apparatuses (e.g., a system, computer program product and/or other devices) and methods for operatively connecting with a block chain distributed network and using the block chain distributed network for facilitating tracking and validation of resource allocations, obligations to return allocated resources, and the complete and/or partial satisfaction of obligations to return allocated resources.

In some embodiments, the block chain database may include real-time resource availability information, including real-time information about obligations by users to return portions of a divisible resource and the satisfaction (including partial, or fractional, satisfaction) of such obligations. In some embodiments, the block chain database may identify and store in a distributed ledger information pertaining to the status and/or location of a portion of a resource and/or a user's obligation to return a particular portion of a resource, over time. Each time a transaction involving a portion of a resource occurs over time, the block chain database adds the new transaction to the distributed ledger. In this way, the movement of portions of a resource, obligations to return portions of the resource, and the complete and/or partial satisfaction of such obligations can be tracked over time. A portion of a resource (and one or more attendant obligations to return that portion of the resource) may rapidly move between users and, by using the block chain database, transactions between and amongst users can be validated for purposes of further transactions. For example, one user may have previously borrowed a particular portion of a particular resource that a second user subsequently requests. The system may determine the degree to which the first user has satisfied their obligation to return the portion of the resource and otherwise confirm that the portion requested by the second user is available to be borrowed. Similarly, if instead of returning the portion of the resource, the first user satisfies the second user's request by passing the requested resource to the second user directly, entries in the distributed ledger can be updated to reflect the transactions and verify the movement of the portion of the resource. The generated chain of transaction records may track how a portion of a resource is used and/or moves over time, and how obligations to return resources are met and/or satisfied over time. Using the block chain database allows for tracking of the resource portions and user obligations by maintaining an ongoing record of end-points for the received resource allocations. This tracks transactions such as loans and repayments and the like amongst users in a distributed fashion that can be externally validated by others, including, but not limited to, other users who are authorized to access portions of the resource.

Embodiments of the invention are directed to a system, method, or computer program product for a distributive network system with specialized data feeds associated with the distributive network and specific triggering events associated with the data feeds for resource distribution, the tracking of user obligations, and the validation of status of one or more portions of a resource. Thus, the system may communicate with, store, and execute code for real-time identification via a block chain database architecture.

Many of the example implementations described herein contemplate the use of a block chain database architecture to store and validate information pertaining to the use and sharing of a pool of loanable funds amongst a plurality of users. Some such example implementations are particularly applicable contexts where a set of participants, or users, each individually require a loan, but cannot individually acquire access to a loan at the desired scale, at the desired time, or in accordance with the desired terms. For example, market conditions, the relatively limited amount of the loan required, the timing needs associated with each individual loan need, the transaction costs, and/or other factors may impede the ability of one or more individual users to acquire the desired loan from traditional sources in an individualized manner. In such a context, some example implementations contemplate and recognize that by combining themselves into a pool of participants, a group of users may be able to qualify for a pooled loan of sufficient scale because the combined need, profile, reliability, and/or other characteristics of the combined pool of participants meets the lending requirements imposed by a source of funds.

In some such example implementations, the block chain database architecture is used to track and validate the repayment of fractions of a loan over time, such that participants in the use of the pool of loanable funds and others with access to the block chain database can view, monitor, validate, update, and otherwise obtain real-time and/or near-real-time information regarding the status of loans to individual users and the satisfaction of obligations incurred by borrowers. Such example implementations are particularly advantageous in situations where partial loan payments are made over time at regular and/or irregular intervals, such that the status of the loan can be observed and validated rapidly, which in turn permits the rapid assessment of the availability of funds within the pool of loanable funds, the tracking for sub-loans amongst and between users, and the satisfaction of obligations incurred by users.

Some example implementations contemplate loan sharing in the context of an individual borrower who has access to loans at a scale that may exceed the present needs of the individual borrower. In such example implementations, the individual borrow may be deemed to be a trusted borrower who has a borrowing history, repayment history, or otherwise exhibits a set of characteristics that are associated with a low likelihood that impediments to repayment will arise over the time scale associated with the loan. In some such example implementations, a financial institution may be involved in identifying and/or qualifying one or more trusted borrowers. A financial institution may also be involved in providing, underwriting, and/or facilitating the transfer of loan funds to a trusted borrower.

In one example of loan sharing, a trusted borrower agrees to receive a loan that exceeds the borrower's current loan need. For example, a particular trusted borrower may only have a present need for a loan in the amount of $X_1$, but may qualify for a loan in a larger amount, the amount of $X_2$. Upon receipt funds in the amount of $X_2$, the trusted borrower can then effectively re-loan portions of the unneeded funds (i.e., the difference $(X_2-X_1)$ over and above the trusted borrower's present need), to additional entities A, B, and C. Alternatively, depending on the timing of the trusted borrower's needs, the trusted borrower may opt to effectively re-loan the entire amount (i.e., the entire $X_2$ amount) in portions divided amongst additional entities A, B, and C, and choose to meet the trusted borrower's needs (and obligation to repay the $X_2$ amount owed) as entities A, B, and C repay their individual loans and otherwise satisfy their obligations over time.

Those skilled in the art will recognize that, particularly in situations where the trusted borrower maintains an obligation to repay the full amount of the funds loaned to the trusted borrower, the original source of the loaned funds is largely shielded from the potential for value impairment by the trusted borrower, particularly in situations where the trusted borrower has presented collateral and/or other assurances of the satisfaction of the trusted borrower's obligation in connection with receiving the original loan amount.

In example implementations that contemplate loan sharing, and in example implementations where a set of borrowers combine together to share a pool of loanable funds in the absence of an individual trusted user, several technical impediments to the efficient distribution of resources arise that can be overcome through the implementation and use of one or more a block chain databases. First, the effective tracking of obligations to return a portion of a shared resource (i.e., repay a loan) and the satisfaction of such obligations on a complete and/or partial basis, is often essential to the operation of a pool of loanable funds and to preserving the confidence amongst users/borrowers of the funds (and others associated with the funds) that portions of the funds will be available when they are needed by a particular user, that the status of the funds at any given point in time is accurately assessable, and that users are satisfying their obligations in accordance with the rules associated with each obligation. In situations where multiple users are incurring obligations, obtaining funds, making partial repayments, and/or conducting additional transactions amongst themselves, traditional, centralized ledgers are subject to errors that can improperly propagate and impair the efficient allocation of resources due to on time lags in the receipt of data, data entry errors, and other issues. The use of a block chain database to track and record obligations amongst users and the satisfaction of such obligations can overcome this technical impediment by facilitating the rapid and distributed validation of transactions between and amongst users, particularly transactions involving verifiable actions, such as that repayment of a portion of a loan and other transfers of funds between and amongst users.

The second technical impediment involves the development and sharing of repayment probability profiles for individual users and the assignment of appropriate obligation terms to individual users based on such repayment probability profiles. Particularly in contexts where a large number of users have access to a resource (such as when multiple borrowers access a large pool of loanable funds) many users may be unknown to each other such that there is a low degree of trust amongst users, and such that one user or subset of users may be unable to readily assess and price the repayment probability associated with a particular user, and thus be unable to effectively set terms and other limits on the resources to be lent to that particular user. The use of a block chain database that permits relevant information about each user to be verified and accessed by all other users can overcome this technical impediment. For example, once a repayment probability profile is initially developed for a borrower (such as through the compilation of publicly-available information, information provided by the borrower, and/or other relevant information, such as information held by one or more institutions with a relationship with the borrower) that profile can be stored and distributed via a block chain database, where it can also be updated and further validated as the borrower engages in transactions and meets the borrower's obligations. Moreover, particularly in example implementations where relevant information about a borrower, such as a repayment probability profile, transaction history, and/or history of meeting repayment obligations is accessible via a block chain database associated with a group of borrowers and/or a pool of loanable funds, borrowers may vote or otherwise engage in a collective decision-making process when determining whether a particular potential borrower should be given access to funds, and at what terms the funds should be offered.

In addition to efficiently sharing repayment probability profiles for individual users and the assignment of appropriate obligation terms to individual users based on such repayment probability profiles, the use of a block chain distributed network can also be used to identify and assign how individuals or entities who have provided resource (such as those who have provided a pool of loanable funds to that can be loaned to others) should be repaid with the proceeds of resources as they are returned by borrowers. In some example implementations, some providers of funds may be comfortable providing funds to borrowers with repayment probability profiles that indicate lower repayment probabilities than others, provided that the providers of funds are repaid at a level that is commensurate with the potential outcomes of such borrowing. Moreover, sets of providers may be divided into groups, that can be identified and arranged via the block chain distributed network such that a priority order of repayment is reflected in the arrangement, along with, in some example implementations, adjustments in the return paid to such providers based on the set to which they belong, and the characteristics and/or rules associated with that set.

Those skilled in the art will appreciate that there are example implementations that may advantageously incorporate the assistance and/or expertise of a financial institution in the facilitation of resource allocation via a block chain database, particularly as it applies to the tracking of obligations of borrowers, the development of repayment probability profiles, the transfer of funds between, amongst, and from borrowers, and identifying resource allocation rules or terms (such as rates, timing, and other rules or requirements) that could be used with borrowers (including adjustments and/or customization of loan terms based on the repayment probability profile of a borrower). In some contexts, a financial institution may opt to facilitate the implementation of one or more block chain databases and make them available for use by one or more pools of borrowers. This may be particularly advantageous in contexts where the financial institution has an interest in the operation of the pool of loanable funds, either in the sense that the financial institution is an active participant as a borrower and/or lender, or in the sense that information associated with the pool of loanable funds is valuable to the financial institution (such as when the financial institution assists in providing information about borrowers, terms, market conditions, or the like), or when data derived from the operation of the pool of loanable funds may impact other decisions by a financial institution (such as when a financial institution is considering entering into a separate relationship with an individual borrower who is associated with the pool of loanable funds).

FIG. 1 illustrates block chain system environment 200, in accordance with one embodiment of the present invention. FIG. 1 provides the system environment 200 for which the distributive network system with specialized data feeds associated with the block chain implementation. FIG. 1 provides a unique system that includes specialized servers and systems communicably linked across a distributive network of nodes required to perform the functions of validating the status of resource portions and obligations to return resource portions.

As illustrated in FIG. 1, the block chain distributed network system 208 is operatively coupled, via a network 201 to the user device 204, and to the financial institution server 206. In this way, the block chain distributed network system 208 can send information to and receive information from the user device 204 and the financial institution server 206. FIG. 1 illustrates only one example of an embodiment of the system environment 200, and it will be appreciated that in other embodiments one or more of the systems, devices, or servers may be combined into a single system, device, or server, or be made up of multiple systems, devices, or servers.

The network 201 may be a system specific distributive network receiving and distributing specific network feeds and identifying specific network associated triggers. The network 201 may also be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, the user 202 is an individual that has the ability and/or authority to access a shared resource. Those skilled in the art will appreciate that most example embodiments contemplate multiple such users. For example, as discussed above, a group of users may be borrowers who collectively have access to a pool of loanable funds. Consequently, while only one such user is depicted in FIG. 1, it will be understood that multiple users may operate in system environment 200. In some embodiments, the user 202 has a user device, such as a mobile phone, tablet, computer, or the like. FIG. 1 also illustrates a user device 204. The user device 204 may be, for example, a desktop personal computer, a mobile system, such as a cellular phone, smart phone, personal data assistant (PDA), laptop, or the like. The user device 204 generally comprises a communication device 212, a processing device 214, and a memory device 216. The processing device 214 is operatively coupled to the communication device 212 and the memory device 216. The processing device 214 uses the communication device 212 to communicate with the network 201 and other devices on the network 201, such as, but not limited to the financial institution server 206 and the block chain distributed network system 208. As such, the communication device 212 generally comprises a modem, server, or other device for communicating with other devices on the network 201.

The user device 204 comprises computer-readable instructions 220 and data storage 218 stored in the memory device 216, which in one embodiment includes the computer-readable instructions 220 of a user application 222. In some embodiments, the user application 222 allows a user 202 to complete a transaction.

As further illustrated in FIG. 1, the block chain distributed network system 208 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the financial institution server 206 and the user device 204. As such, the communication device 246 generally comprises a modem, server, or other device for communicating with other devices on the network 201.

As further illustrated in FIG. 1, the block chain distributed network system 208 comprises computer-readable instructions 254 stored in the memory device 250, which in one embodiment includes the computer-readable instructions 254 of an obligation satisfaction application 258. In some embodiments, the memory device 250 includes data storage 252 for storing data related to the system environment, but not limited to data created and/or used by the obligation satisfaction application 258.

Embodiments of the block chain distributed network system 208 may include multiple systems, servers, computers or the like maintained by one or many entities. FIG. 1 merely illustrates one of those systems that, typically, interacts with many other similar systems to form the block chain. In one embodiment of the invention, the block chain distributed network system 208 is operated by a second entity that is a different or separate entity from the financial institution server 206. In some embodiments, the financial institution server 206 may be part of the block chain. Similarly, in some embodiments, the block chain distributed network system 208 is part of the financial institution server 206. In other embodiments, the financial institution server 206 is distinct from the block chain distributed network system 208.

In one embodiment of the block chain distributed network system 208 the memory device 250 stores, but is not limited to, an obligation satisfaction application 258 and a distributed ledger. In some embodiments, the distributed ledger stores data including, but not limited to, smart identification logic and rules, user identifications, user legal identifications, associated logic and rules, resource allocation rules, resource allocation data, obligation rules, user obligation data, user repayment probability profiles, related data, and the like. In one embodiment of the invention, both the obligation satisfaction application 258 and the distributed ledger may associate with applications having computer-executable program code that instructs the processing device 248 to operate the network communication device 246 to perform certain communication functions involving described herein. In one embodiment, the computer-executable program code of an application associated with the distributed ledger and obligation satisfaction application 258 may also instruct the processing device 248 to perform certain logic, data processing, and data storing functions of the application.

The processing device 248 is configured to use the communication device 246 to gather data, such as data corresponding to transactions, blocks or other updates to the distributed ledger from various data sources such as other block chain network system. The processing device 248 stores the data that it receives in its copy of the distributed ledger stored in the memory device 250.

In the embodiment illustrated in FIG. 1 and described throughout much of this specification, the obligation satisfaction application 258 may generate a method and attribute required for satisfying an obligation incurred by a user and/or verifying the satisfaction of an obligation on a complete or partial basis. In this way, the obligation satisfaction application 258 generates a check on the satisfaction of an obligation. As such, the obligation satisfaction application 258 may not store a balance associated with a particular obligation, but instead may store an explicit guarantee that an obligation exists, has been satisfied, or that an obligation has been satisfied to a particular degree. As such, the obligation satisfaction application 258 may receive and store obligation information (and/or obligation satisfaction information), data associated with transactions associated with efforts to satisfy an obligation, data extracted from documentation associated with an obligation and the satisfaction of an obligation, data identifying resource availability for a pool of resources account associated with an obligation, and based on confirmation of the received data, confirm whether and to what degree an obligation associated with a borrowed portion of a resource has been satisfied.

The obligation satisfaction application 258 may receive and/or confirm with other entities the satisfaction of an obligation through interaction with other entities. In this way, the block chain database connects with entities associated with a user and/or an obligation associated with a user, such as account issuing entities, holding entities, and/or management entities to generate a block chain database with information about the user, obligations incurred by the user, the satisfaction of obligations by the user, and/or obligations owed to the user by others. Furthermore, the obligation satisfaction application 258 may generate a token that is associated with a user and/or a particular obligation. In this way, upon communication with other systems on the network 201, the obligation satisfaction application 258 may communicate the token, thus not communicating or displaying sensitive or private information. The obligation satisfaction application 258 associated with the block chain distributed network system 208 maintains a list of data records, such as tokens associated with one or more users and obligations, the security of which is enhanced by the distributed nature of the block chain. A block chain typically includes several nodes, which may be one or more systems, machines, computers, databases, data stores or the like operably connected with one another which is further illustrated below in FIG. 2B. The nodes in the block chain may be entities such as financial institutions that function as gateways for other entities.

In some embodiments, the obligation satisfaction application 258 may receive obligation satisfaction information via a generated method and attribute for requesting satisfaction information associated with an obligation. In this way, resource users (such as borrowers), resource holders or others responsible for the maintenance of resources and/or obligations associated with resources, financial institutions, users 202 or the like may provide obligation satisfaction information to the obligation satisfaction application 258, such that the obligation satisfaction application 258 may have an indication of confirmation that an obligation has been satisfied (including partially satisfied). As such, the obligation satisfaction application 258 may not necessarily store a balance associated with an obligation, but instead store an explicit guarantee regarding the existence, satisfaction, and/or partial satisfaction of an obligation.

In some embodiments, the obligation satisfaction application 258 receives data associated with an instrument or other documentation being used for obligation satisfaction. As such, the obligation satisfaction application 258 may receive via the network 201 an electronic copy of the instrument, documentation, and/or information associated with the obligation or the satisfaction thereof. In some embodiments, the receiver of the instrument (or other documentation) may provide the obligation satisfaction application 258 with the instrument being presented to him/her for satisfaction of an obligation. In other embodiments, a user 202 may notify the obligation satisfaction application 258 of the use of an instrument for obligation satisfaction. In yet other embodiments, a financial institution via a financial institution server 206 may provide the indication of an instrument being presented for obligation satisfaction.

In some embodiments, the obligation satisfaction application 258 extracts data from the instrument. As such, the information associated with the instrument is extracted by the obligation satisfaction application 258 via scan, text recognition, or the like. The obligation satisfaction application 258 may identify account numbers, resource values, user names, or the like associated with the instrument. Furthermore, the obligation satisfaction application 258 may correlate the account numbers and user names to tokens for user and obligation(s) associated with the user. As such, not disseminating account number and user names, but instead associating them with tokens.

In some embodiments, the obligation satisfaction application 258 identifies the satisfaction of an obligation via communication with an originating entity, such as a financial institution or other entity that holds an obligation incurred by a user. In this way, the obligation satisfaction application 258 may, using the information extracted from the instrument, identify a user 202 and an obligation associated with the user and generate and/or identify a token associated therewith. The obligation satisfaction application 258 may identify this based on an account number associated with a transaction performed in satisfaction of an obligation. The obligation satisfaction application 258 may associate the account number with a token. As such, the obligation satisfaction application 258 may utilize the token as the account number throughout the process such that at no point may the actual account number be disseminated. Subsequently, the obligation satisfaction application 258 may identify the obligation associated with the user and/or documentation associated with the satisfaction of the obligation by searching the distributed ledger. Once identified, the obligation satisfaction application 258 compares the obligation associated with the user to the efforts undertaken by the user to satisfy the obligation, thus confirming the satisfaction (or degree of satisfaction) of the obligation.

In some embodiments, the obligation satisfaction application 258, based on confirmation of the satisfaction of an obligation, publishes the satisfaction of the obligation. As such, the obligation satisfaction application 258 may communicate the satisfaction of the obligation. The communication may be electronic form, such as an email, text message, or the like. Furthermore, the obligation satisfaction application 258 may mark the resources received in satisfaction of the obligation as available for redistribution (as in the case where multiple users may have a need for the previously borrowed resource) in the distributed ledger mark in the distributed ledger the satisfaction of an obligation previously associated with a particular user.

As illustrated in FIG. 1, the financial institution server 206 is connected to the block chain distributed network system 208 and is associated with a financial institution network. In this way, while only one financial institution server 206 is illustrated in FIG. 1, it is understood that multiple network systems may make up the system environment 200. The financial institution server 206 generally comprises a communication device 236, a processing device 238, and a memory device 240. The financial institution server 206 comprises computer-readable instructions 242 stored in the memory device 240, which in one embodiment includes the computer-readable instructions 242 of an institution application 244. The financial institution server 206 may communicate with the block chain distributed network system 208 to provide real-time resource availability for a user account. While the block chain distributed network system 208 may communicate with the financial institution server 206 via a secure connection generated for secure encrypted communications between the two systems for communicating a resource commitment for an obligation such that resources are allocated for the obligation and are not available for subsequent use.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 2A illustrates a centralized database architecture environment 300, in accordance with one embodiment of the present invention. The centralized database architecture comprises multiple nodes from one or more sources and converge into a centralized database. The system, in this embodiment, may generate a single centralized ledger for data received from the various nodes.

FIG. 2B provides a block chain system environment architecture 400, in accordance with one embodiment of the present invention. Rather than utilizing a centralized database of data for validation of obligation satisfaction, as discussed above in FIG. 2A, various embodiments of the invention may use a decentralized block chain configuration or architecture as shown in FIG. 2B in order to facilitate validation and verification of the satisfaction of obligations associated with an user's access of a portion of a shared resource, including but not limited to the validation and verification of the complete or partial satisfaction by a borrower of an obligation associated with the borrowing of funds from a larger pool of loanable funds. Such a decentralized block chain configuration ensures accurate mapping of resources available within a shared resource (such as a pool of loanable funds) and ensures accurate mapping of obligations incurred by users who have borrowed resources, along the status of each user's satisfaction of their respective obligations. Accordingly, a block chain configuration may be used to maintain an accurate ledger of resources, obligations to return and/or repay resources, and to provide validation transactions associated with the satisfaction of obligations associated with those resources. For example, the block chain database may include real-time resource availability for a user who has access to a shared resource, such as a pool of funds and/or real-time status information associated with a user's satisfaction of an obligation associated with a borrowed or loaned resource, including the user's partial satisfaction of one or more obligations. Upon making a payment or other action in satisfaction or partial satisfaction of an obligation associated with a resource borrowed by a user, the user (or an individual or entity tasked with receiving obligation satisfaction materials, or otherwise associated with the obligation) may transmit documentation or other data associated with the satisfaction of the obligation to the system. The block chain system may identify the obligation, identify the user associated with the obligation, and identify the degree to which the obligation has been satisfied. The system may confirm with the user and/or the recipient of a payment associated with the user's obligation that the obligation has been at least partially satisfied, and the degree to which the obligation has been satisfied. The system may also identify and/or update the status of the shared resource (such as the status of a pool of loanable funds) such that the user and/or others associated with the resource can ascertain the status of the shared resource and the user's satisfaction of the user's obligation(s) associated with the resource. As such, the system may validate and verify the issuance of resource portions to one or more users and the user's satisfaction of obligations to return or repay those resource portions.

A block chain or blockchain is a distributed database that maintains a list of data records, such as real-time status of obligations held by one or more users associated with a shared resource, the security of which is enhanced by the distributed nature of the block chain. A block chain typically includes several nodes, which may be one or more systems, machines, computers, databases, data stores or the like operably connected with one another. In some cases, each of the nodes or multiple nodes are maintained by different entities. A block chain typically works without a central repository or single administrator. One well-known application of a block chain is the public ledger of transactions for cryptocurrencies. The data records recorded in the block chain are enforced cryptographically and stored on the nodes of the block chain.

A block chain provides numerous advantages over traditional databases. A large number of nodes of a block chain may reach a consensus regarding the validity of a transaction contained on the transaction ledger. As such, the status of the obligation, the satisfaction of the obligation, and the resources associated therewith can be validated and cleared by one participant.

The block chain system typically has two primary types of records. The first type is the transaction type, which consists of the actual data stored in the block chain. The second type is the block type, which are records that confirm when and in what sequence certain transactions became recorded as part of the block chain. Transactions are created by participants using the block chain in its normal course of business, for example, when someone sends cryptocurrency to another person, and blocks are created by users known as "miners" who use specialized software/equipment to create blocks. In some embodiments, the block chain system is closed, as such the number of miners in the current system are known and the system comprises primary sponsors that generate and create the new blocks of the system. As such, any block may be worked on by a primary sponsor. Users of the block chain create transactions that are passed around to various nodes of the block chain. A "valid" transaction is one that can be validated based on a set of rules that are defined by the particular system implementing the block chain. For example, in the case of cryptocurrencies, a valid transaction is one that is digitally signed, spent from a valid digital wallet and, in some cases that meets other criteria.

As mentioned above and referring to FIG. 2B, a block chain system 400 is typically decentralized—meaning that a distributed ledger 402 (i.e., a decentralized ledger) is maintained on multiple nodes 408 of the block chain 400. One node in the block chain may have a complete or partial copy of the entire ledger or set of transactions and/or blocks on the block chain. Transactions are initiated at a node of a block chain and communicated to the various nodes of the block chain. Any of the nodes can validate a transaction, add the transaction to its copy of the block chain, and/or broadcast the transaction, its validation (in the form of a block) and/or other data to other nodes. This other data may include time-stamping, such as is used in cryptocurrency block chains. In some embodiments, the nodes 408 of the system might be financial institutions that function as gateways for other financial institutions. For example, a credit union might hold the account, but access to the distributed system through a sponsor node.

Various other specific-purpose implementations of block chains have been developed. These include distributed domain name management, decentralized crowd-funding, synchronous/asynchronous communication, decentralized real-time ride sharing and even a general purpose deployment of decentralized applications. The block chain 400 may perform one or more of the steps or functions performed by the block chain distributed network system as discussed above with reference to FIG. 1.

In various embodiments of the invention, a block chain implementation is used to implement the validation and verification of the satisfaction by a user of an obligation to return a resource portion that has previously been borrowed by the user. For payments (such as when a borrower makes a complete or partial payment on a loan) and/or resource distribution, multiple active directories may be created. In such cases, a need exists to ensure mappings are not overloaded or redirected and in order to maintain a complete audit trail. The block chain configuration is used to index accounts and resources via mappings in all directories and maintain a full and visible audit trail. Mining is used, in some embodiments, to ensure that changes to specific mappings (e.g., mapping an alias to a financial institution and/or mapping resources in an account or resource pool) are confirmed and/or have reached a predetermined level of consensus. This also ensures unauthorized users are not manipulating the directories.

A satisfaction (including a partial satisfaction) of an obligation associated with a resource portion borrowed by a user may require that the satisfaction (such as a payment) is mapped to the appropriate user and/or the appropriate resource portion, financial institution, holder of the obligation, or other individual or entity associated with the obligation and/or the resource portion. This information must be universally available to everyone on the network, and the block chain configuration enables such information distribution. In some embodiments of the invention, such a mapping, while integral to clearing (or validating) the satisfaction of the obligation, aspects of the mapping of the satisfaction of the obligation may be maintained as private information. For example, the mapping of a satisfaction of an obligation (such as a repayment of a loan) to an account number may be maintained at a server local to the financial institution. Thus, once a satisfaction of an obligation has been placed on the public block chain, the block chain network recognizes that the satisfaction of the obligation is mapped to a particular financial institution. That financial institution's server or system connected to the block chain receives the information about the requested satisfaction of the obligation and can validate that the transaction may be validated by looking up the appropriate mapping of, for example, the payment on a loan obligation, to an account and the transaction data within the account. As noted, this information is not placed on the public block chain, but rather is held privately, such as on a private block chain or a "side-chain".

One advantage of using a block chain configuration for validation and/or verification of the satisfaction of an obligation is the expedited conversion and an opportunity for scaling. Thousands of financial institutions, other resource providers (such as lenders), and resource recipients (such as borrowers) may participate in a block chain implementation, and, therefore, the time to validation of a satisfaction of an obligation may be shortened. For example, a proposed satisfaction of an obligation that is placed on the block chain may be validated by one or a predetermined number of nodes of the block chain in order for the satisfaction to be recognized. The nodes may work as miners or "validators" in order to confirm that a transaction associated with a satisfaction of an obligation has properly occurred, and is mapped to a particular, valid obligation (and/or satisfaction thereof). This determination may be based on the fact that the user or other individual or entity that originally mapped the obligation and/or the satisfaction of the obligation has placed it on the block chain and in some cases, has included additional information such as a key that validates the satisfaction of the obligation. In some embodiments, the key may be a digital signature that may be coupled with additional information that makes a declaration of validity by a financial institution and/or another entity holding the obligation or responsible for monitoring the satisfaction of the obligation.

The block chain may be configured with a set of rules to dictate when and how satisfactions of obligations validated and recognized as being satisfied by the user. In some embodiments, the rules dictate that the entity that holds the obligation of a particular user or the entity that originally issued the resource to the user who incurred the obligation must approve a transaction for satisfaction of the obligation. In some embodiments, the transaction for satisfaction of the obligation may be posted to the block chain by an entity acting an agent for the user. In some embodiments, the rules dictate that some or all transactions for the satisfaction of an obligation may be approved by one or more validator nodes without further input from the user or the holder of the obligation other than the validation of the mapped obligation and satisfaction thereof. In some such cases, the rules dictate that the mapped obligation (or satisfaction of the obligation), when placed on the block chain also includes additional information that is useful in determining whether transactions associated with the obligation have satisfied the obligation and/or to what degree the obligation has been satisfied.

FIG. 3 provides a high level process flow illustrating a block chain resource distribution and obligation satisfaction process 100, in accordance with one embodiment of the present invention. As depicted in block 102, the process 100 is initiated by recognizing a finite divisible resource associated with a plurality of users. In some example implementations, the finite divisible resource is a pool of loanable funds, such a pool of funds that can be accessed by and shared amongst a plurality of users. As discussed throughout this disclosure, many of the example implementations contemplated in accordance with the invention arise in the context of a plurality of users who are eligible to be borrowers of a portion of a pool of loanable funds. However, it will be appreciated that any implementations of block 102 may contemplate and use any finite divisible resource, including but not limited to the resources referenced elsewhere herein, or otherwise known now or developed later.

In some example implementations of block 102, recognizing a finite divisible resource associated with at plurality of users comprises receiving an indication that a user from amongst the plurality of users wishes to engage in a transaction associated with the finite divisible resource, such as an indication that loan is to be made to an individual user amongst the plurality of users, that a user wishes to engage in a transaction in satisfaction or partial satisfaction of an obligation associated with the finite divisible resource, and/or that a user wishes to request that a portion of the finite divisible resource be transferred to the user. In some example implementations, such an indication may be transmitted by a financial institution, via the financial institution server described herein, or otherwise through a communication channel established between a financial institution and an entity performing process 100. In some other example implementations, such an indication may be transmitted by a user via a user device or some other communication channel established with a user.

As depicted in FIG. 3, process 100 continues in block 104 with identifying a first portion of the divisible resource to be assigned to a first user from among the plurality of users. In example implementations of block 104 that arise in the context of a pool of loanable funds, the first portion of the divisible resource may be a particular loan amount that has been requested by a user or borrower, or may be a greater or lesser amount as determined by others. In some example implementations of block 104, identifying a first portion of the divisible resource comprises receiving an indication of authorization from a representative of the plurality of users. In such example implementations, one or more users amongst the plurality of users may vote upon a request from a user for a particular loan or resource portion, and a representative of the plurality of users may transmit the results of such a vote for processing such that a user requesting a loan or otherwise seeking to access a portion of the finite divisible resource may be permitted to receive the requested amount or some other amount. Regardless of whether a voting operation is undertaken or not, some example implementations of block 104 contemplate identifying a particular portion of a finite divisible resource that may be allocated to a user.

Process 100 continues in block 106 with transmitting to a distributed ledger an indication that the first portion of the divisible resource is to be assigned to the first user. In many example embodiments, the distributed ledger is implemented as a block chain distributed network. Regardless of whether a block chain distributed network is involved with an example implementation of block 106, the transmitting contemplated in block 106 (and in other transmission and/or receiving steps described herein) may be accomplished through dedicated transmission channels or non-dedicated transmission pathways as may be recognized and acceptable to those skilled in the art.

As depicted in block 108, process 100 includes receiving from the distributed ledger an indication that the first portion of the divisible resource is available to be assigned to the first user. In example implementations, blocks 106 and 108 act a check to ensure that the first portion of the finite divisible resource is available to be lent to the first user, and prevents the inadvertent assignment of the same resource portion to two separate borrowers, which can in conventional systems though error propagation in a central ledger, and/or other errors to which conventional, centralized resource allocation and distribution systems are susceptible.

In instances where the first portion is available to be assigned, process 100 includes block 110, which involves transmitting to the first user the first portion of the finite divisible resource. It will be appreciated that the precise mechanism through which the first portion of the finite divisible resource is transmitted is largely dependent on the nature of the finite divisible resource. In implementations that contemplate a pool of loanable funds, any mechanism used to move monetary resources from the custody of one entity to another may be used, such as the physical delivery of cash, a check, or other negotiable instrument, wire transfer, other electronic transfer, or any other appropriate mechanism. Where particularized, distinct resource portions are required (such in the case of serialized bills, distinct pieces of property, or the like) are involved, physical delivery or other transfer may be used in connection with implementations of block 110.

As depicted in block 112, process 100 includes receiving from the first user an indicator of an obligation to return the first portion of the finite divisible resource. Examples of indicators of an obligation to return the first portion of the finite divisible resource include, but are not limited to, a token associated with the user, contract documents, receipts, other documentation, a user's signature (including but not limited an electronic signature), recording, or other document, item, or data set sufficient to indicate that the user has incurred and/or agreed to the obligation to return the first portion of the finite divisible resource. In example implementations involving a pool of loanable funds, such an indicator may include loan contract documentation that set forth additional terms regarding the specific obligation incurred by the first user, a pointer or link to a location where such documentation is stored or otherwise available, a token or other data set indicating the any required documentation has been completed, or any other set of data or information indicating that the first user has incurred an obligation associated with the first portion of the finite divisible resource, namely, the borrowed funds.

In block 114, process 100 continues with transmitting to the distributed ledger a record associated with the first user, the first portion of the finite divisible resource, and the obligation to return the first portion. In some example implementations of block 114 the record transmitted to the distributed ledger comprises a record in a predetermined format, which may, in some example implementations, include digital copies of relevant documentation, such as an identification of the first user, specific information about the first portion of the finite divisible resource, and specific information about the obligation incurred by the first user. In some example implementations, such a record may include pointers or hyperlinks to locations where such information is stored, and may be viewed or otherwise verified. In some such example implementations, an in other implementations, such a record may incorporate additional information, datasets, tokens, and other information associated with the first user, the borrowed first portion of the finite divisible resource, and/or the obligation.

As shown in block 116, process 100 includes receiving from the distributed ledger an indication that the distributed ledger had been updated to reflect the transmission of the first portion of the finite divisible resource to the first user and the obligation to return the first portion. In example implementations of block 116 that are performed in a block chain distributed network environment, the indication may include a confirmation that data in the record transmitted as in block 114 has been validated and/or verified.

Process 100 continues in block 118, which includes receiving an indication that the first user has satisfied the obligation to return the first portion of the finite divisible resource. In some example implementations of block 118, the indication that the first use has satisfied the obligation to return the first portion of the finite divisible resource comprises receiving an indication that the entire obligation has been satisfied. Other example implementations contemplate a partial satisfaction of the obligation, such as when a partial payment or periodic partial payment is made on a loan. Some example implementations of block 118 further include receiving a confirmation that the first portion of the finite divisible resource has been returned. Some such example implementations contemplate the receipt from the block chain distributed network a confirmation that the obligation has been satisfied, such as through the verification of a transaction performed in satisfaction of the obligation, or via any other approach to verifying that an obligation has been satisfied and that the first portion of the finite divisible resource has been returned.

As shown in block 120, process 100 comprises transmitting to the distributed ledger an indication that the first user has satisfied the obligation and that the first portion has been returned. In some example implementations of block 120, once the satisfaction of the obligation (including but not limited to the partial satisfaction of the obligation) has been confirmed, transmitting an indication that the first user has satisfied the obligation permits the distributed ledger to be updated and, in the case of an implementation in a block chain distributed network, validated and/or otherwise verified.

Process 100 also incorporates block 122, which comprises receiving from the distributed ledger an indication that the distributed ledger has been updated to reflect the satisfaction of the obligation and the return of the first portion of the finite divisible resource. In some example implementations of block 122, the distributed ledger may transmit an indication that it has been updated to users of the finite distributed resource. In some example implementations, block 122 further comprises receiving from the distributed ledger an indication that the first portion of the finite divisible resource is available for redistribution. In example implementations where such information is transmitted to users, users may then be able to request the re-issuance (or re-loaning) of returned (or repaid) funds.

FIG. 4 provides a process flow illustrating a block chain obligation verification and resource distribution process 500, in accordance with one embodiment of the present invention. As shown in block 502, process 500 is directed to situations where a second user requests the portion of the finite divisible resource (or a fraction thereof) that has previously been assigned to a first user, and for which a first user has incurred an obligation. In some example implementations, of process 500, such a situation may arise where a first user has been involved in a part of the process depicted in FIG. 3, namely, blocks 102-116.

As shown in FIG. 4, process 500 continues in block 504, which comprises receiving from a second user from among the plurality of users a request for the first portion of the finite divisible resource. Process 500 generally, and block 504 in particular, contemplate a situation to which conventional systems are susceptible to error (particularly in large-scale implementations), namely, the inadvertent request for resource portions that are unavailable at a given time. Particularly in the implementations where the finite divisible resource is composed of relatively fungible units (such as loanable funds or commodities), there is the potential in conventional systems that a particular portion of a resource may be effectively "double counted" such that the same funds are loaned to multiple entities such that the resource can be over-subscribed or over-extended.

Continuing in block 506, process 500 includes transmitting to the distributed ledger an indication that the second user has requested that the first portion of the divisible resource be assigned to the second user. In some example implements, as with implementations of process 100, the distributed ledger may be implemented as a block chain distributed network.

As shown in block 508, process 500 comprises receiving form the distributed ledger an indication that the first portion of the divisible resource is unavailable to be assigned to the second user. As discussed throughout this disclosure, particularly with reference to FIG. 1 and the discussion of the block chain distributed network contained throughout, one of the particular advantages of the invention disclosed herein is the ability to rapidly verify whether a user has satisfied an obligation to return a portion of a resource such that the portion of the resource would be available for reissuance to a second user. In the situation contemplated in FIG. 4, the first user has not yet satisfied their obligation with respect to the particular portion of the first resource, and thus the resource requested by the second user is unavailable. As a result, and as shown in block 510, the request from the second user for the first portion of the finite divisible resource is rejected.

FIG. 5 provides a process flow illustrating an obligation and resource transfer process 600, in accordance with one embodiment of the present invention. Process 600 contemplates example implementations of the invention disclosed herein where the users associated with the finite divisible resource are able to leverage the information contained and accessible via the distributed ledger (particularly where the distributed ledger is implemented as a block chain distributed network and accessible to all users) to engage in valid, verifiable transfers of a portion of a resource and the tracking of obligations related thereto without the impediment of the inefficiencies inherent in a centrally-controlled system. As such, process 600 begins, as shown in block 602, in the situation where a first user has already received a first portion of a finite divisible resource (such as a subset of a pool of loanable funds), and has incurred a valid obligation to return that portion. Process 600 differs from process 500 in that, upon recognizing that a second user has made a request for the particular resource portion held by the first user (such request being unable to be satisfied without the cooperation of the first user), the first user opts to transfer the first portion of the finite divisible resource to the second user. In a simplified example, the first user has received a particular set of funds from a pool of loanable funds, and the second user requests those same funds, in the sense that either the second user has requested the specific funds that were issued to the first user, or in the sense that there are no other funds to be issued to the second user as the funds necessary to satisfy the second user's request may be, at least temporarily, issued to other users. Upon recognizing that the second user needs the funds, the first user may decide that, instead of making use of the funds itself, the first user will assign or transfer the funds to the second user.

As shown in block 604, process 600 includes receiving an indication that the first user has assigned the first portion of the finite divisible resource to a second user from among the plurality of users. In some example implementations, such an indication may come from the first user, the second user, or another entity that is associated with the transfer of the first portion of the finite divisible resource to the second user.

As shown in block 606, process 600 also includes receiving an indication of an obligation by the second user to return the first portion of the finite divisible resource. In some example implementations, the obligation may be directed to the first user, in the sense that the second user is obligated to return the transferred resource portion to the first user. For example, the first user may have borrowed more money than the first user actually needed to meet the underlying need that drove the first user to seek to borrow the first portion of a pool of loanable funds, and opts re-loan the unused funds in the hopes of defraying interest and/or other transaction cost, or using the unused funds as an investment in the form of an interest-bearing loan to the second user. In situations where the repayment probability profile of the first user allows the first user to borrow funds at more advantageous terms than the second user, the first user may be able to take advantage of a difference between the terms that the second user would be obligated to meet (such as increased interest or a one-time additional payment, for example). It will be appreciated that implementations of block 112 as discussed in relation to FIG. 1, may be applicable to implementations of block 606.

As shown in block 608, process 600 includes transmitting to the distributed ledger a record associated with the second user, the first portion of the finite divisible resource, and the obligation to return the first portion. Similar to block 114, as discussed in connection to FIG. 1, example implementations of block 608 can be executed using any form of data, including copies of relevant documentation and/or representations thereof, such as tokens, pointers, hyperlinks, or the like.

Process 600 concludes at block 610, which comprises receiving from the distributed ledger an indication that the distributed ledger had been updated to reflect the transmission of the first portion of the finite divisible resource to the second user and the obligation by the second user to return the first portion. Implementations that are possible and applicable with respect to with block 116, as shown in FIG. 1 and discussed herein, may also be used with respect to block 610. Moreover, in the specific context of block 610, the obligation of the first user to return the first portion of the resource may or may not remain operative, depending on the rules governing the particular implementation. For example, in some situations, the transfer of funds from one user to another may effectively cancel the first user's obligation, as the funds are no longer in their possession. In other situations, all previously valid obligations may remain operative until the portion of the resource portion is returned and the terms of each individual's particular obligation satisfied, in order to limit the potential for an unforeseen compounding effect of the impediments to repayment.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with the in authorization and instant integration of a new credit card to digital wallets.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. patent application Ser. No. | Title | Filed On |
|---|---|---|
| 14/942,326 published as U.S. patent application Pub. No. 2017/0140408 | TRANSPARENT SELF-MANAGING REWARDS PROGRAM USING BLOCKCHAIN AND SMART CONTRACTS | Nov. 16, 2015 |
| 15/041,555 published as U.S. patent application Pub. No. 2017/0132630 | BLOCK CHAIN ALIAS FOR PERSON-TO-PERSON PAYMENTS | Feb. 11, 2016 |
| 62/253,935 | BLOCK CHAIN ALIAS PERSON-TO-PERSON PAYMENT | Nov. 11, 2015 |
| 15/041,566 published as U.S. patent application Pub. No. 2017/0132615 | BLOCK CHAIN ALIAS PERSON-TO-PERSON PAYMENTS | Feb. 11, 2016 |
| 15/050,375 published as U.S. patent application Pub. No. 2017/0244757 | SYSTEM FOR CONVERSION OF AN INSTRUMENT FROM A NON-SECURED INSTRUMENT TO A SECURED INSTRUMENT IN A PROCESS DATA NETWORK | Concurrently Herewith |
| 15/050,379 published as U.S. patent application Pub. No. 2017/0243215 | SYSTEM FOR EXTERNAL SECURE ACCESS TO PROCESS DATA NETWORK | Concurrently Herewith |
| 15/050,358 published as U.S. patent application Pub. No. 2017/0244721 | SYSTEM FOR PROVIDING LEVELS OF SECURITY ACCESS TO A PROCESS DATA NETWORK | Concurrently Herewith |
| 62/293,585 | SYSTEM FOR SECURE ROUTING OF DATA TO VARIOUS NETWORKS FROM A PROCESS DATA NETWORK | Feb. 10, 2016 |
| 62/293,620 | SYSTEM FOR CENTRALIZED CONTROL OF SECURE ACCESS TO PROCESS DATA NETWORK | Feb. 10, 2016 |
| 15/049,605 published as U.S. patent application Pub. No. 2017/0230353 | SYSTEM FOR CONTROL OF SECURE ACCESS AND COMMUNICATION WITH DIFFERENT PROCESS DATA NETWORKS WITH SEPARATE SECURITY FEATURES | Concurrently Herewith |
| 15/049,716 published as U.S. patent application Pub. No. 2017/0243208 | SYSTEM FOR CONTROL OF DEVICE IDENTITY AND USAGE IN A PROCESS DATA NETWORK | Concurrently Herewith |
| 15/049,777 published as U.S. patent application Pub. No. 2017/0244707 | SYSTEM FOR ESTABLISHING SECURE ACCESS FOR USERS IN A PROCESS DATA NETWORK | Concurrently Herewith |
| 15/049,835 published as U.S. patent application Pub. No. 2017/0243286 | SYSTEM FOR ALLOWING EXTERNAL VALIDATION OF DATA IN A PROCESS DATA NETWORK | Concurrently Herewith |
| 15/050,094 published as U.S. patent application Pub. No. 2017/0214699 | SYSTEM FOR CONVERSION OF AN INSTRUMENT FROM A NON-SECURED INSTRUMENT TO A SECURED INSTRUMENT IN A PROCESS DATA NETWORK | Concurrently Herewith |
| 62/287,293 | SYSTEM FOR CONVERSION OF AN INSTRUMENT FROM A NON-SECURED INSTRUMENT TO A SECURED INSTRUMENT IN A PROCESS DATA NETWORK | Jan. 26, 2016 |
| 15/050,098 published as U.S. patent application Pub. No. 2017/0213211 | SYSTEM FOR TRACKING AND VALIDATION OF MULTIPLE INSTANCES OF AN ENTITY IN A PROCESS DATA NETWORK | Concurrently Herewith |
| 62/287,301 | SYSTEM FOR TRACKING AND VALIDATION OF MULTIPLE INSTANCES OF AN ENTITY IN A PROCESS DATA NETWORK | Jan. 26, 2016 |
| 15/050,084 patented as U.S. Pat. No. 9,825,931 | SYSTEM FOR TRACKING AND VALIDATION OF AN ENTITY IN A PROCESS DATA NETWORK | Concurrently Herewith |
| 62/287,298 | SYSTEM FOR TRACKING AND VALIDATION OF AN ENTITY IN A PROCESS DATA NETWORK | Jan. 26, 2016 |
| 15/050,372 published as U.S. patent application Pub. No. 2017/0243217 | SYSTEM FOR ROUTING OF PROCESS AUTHORIZATIONS AND SETTLEMENT TO A USER IN A PROCESS DATA NETWORK | Concurrently Herewith |
| 15/050,285 published as U.S. patent application Pub. No. 2017/0243177 | SYSTEM FOR ROUTING OF PROCESS AUTHORIZATION AND SETTLEMENT TO A USER IN PROCESS DATA NETWORK BASED ON SPECIFIED PARAMETERS | Concurrently Herewith |
| 15/050,292 published as U.S. patent application Pub. No. 2017/0243209 | SYSTEM FOR GRANT OF USER ACCESS AND DATA USAGE IN A PROCESS DATA NETWORK | Concurrently Herewith |
| 15/050,294 published as U.S. patent application Pub. No. 2017/0243212 | SYSTEM FOR IMPLEMENTING A DISTRIBUTED LEDGER ACROSS MULTIPLE NETWORK NODES | Concurrently Herewith |
| 15/049,865 published as U.S. patent application Pub. No. 2017/0244720 | SYSTEM FOR EXTERNAL VALIDATION OF Private-to-public Transition Protocols | Concurrently Herewith |
| 15/050,316 published as U.S. patent application Pub. No. 2017/0243214 | SYSTEM FOR TRACKING TRANSFER OF RESOURCES IN A PROCESS DATA NETWORK | Concurrently Herewith |
| 15/050,321 published as U.S. patent application Pub. No. 2017/0243287 | SYSTEM FOR MANAGING SERIALIZABILITY OF RESOURCE TRANSFERS IN A PROCESS DATA NETWORK | Concurrently Herewith |
| 15/050,307 published as U.S. patent application Pub. No. 2017/0243213 | SYSTEM TO ENABLE CONTACTLESS ACCESS TO A TRANSACTION TERMINAL USING A PROCESS DATA NETWORK | Concurrently Herewith |

What is claimed is:

1. A system for validating a status of a distributed resource, the system comprising:
   a memory device with computer-readable program code stored thereon;

a communication device;
a processing device operatively coupled to the memory device and the communication device, wherein the processing device is configured to execute the computer-readable program code to:
recognize a finite divisible resource associated with a plurality of users, wherein the finite divisible resource is a pool of loanable funds of an entity;
identify a first portion of the divisible resource to be assigned to a first user from among the plurality of users;
transmit to a block chain distributed ledger an indication that the first portion of the divisible resource is to be assigned to the first user;
receive from the block chain distributed ledger an indication that the first portion of the divisible resource is available to be assigned to the first user;
transmit to the first user the first portion of the finite divisible resource;
receive from the first user documentation of an obligation of the first user to return the first portion of the finite divisible resource to the entity;
extract data from the documentation;
identify private information in the data extracted from the documentation;
associate one or more tokens with the private information;
store the private information on a private block chain distributed ledger;
transmit to the block chain distributed ledger a record associated with the first user, the first portion of the finite divisible resource, and the obligation of the first user to return the first portion to the entity, wherein the record includes the one or more tokens and does not include the private information;
validate, via one or more nodes of the block chain distributed ledger, the record associated with the first user, the first portion of the finite divisible resource, and the obligation of the first user to return the first portion to the entity;
receive from the block chain distributed ledger an indication that the block chain distributed ledger had been updated to reflect the transmission of the first portion of the finite divisible resource to the first user and the obligation of the first user to return the first portion to the entity;
receive an indication that the first user has assigned the first portion of the finite divisible resource to a second user from among the plurality of the users;
receive an indication of an obligation of the second user to return the first portion of the finite divisible resource to the first user;
transmit to the block chain distributed ledger a record associated with the second user, the first portion of the finite divisible resource, and the obligation of the second user to return the first portion to the first user;
validate, via the one or more nodes of the block chain distributed ledger, the record associated with the second user, the first portion of the finite divisible resource, and the obligation of the second user to return the first portion to the first user; and
receive from the block chain distributed ledger an indication that the block chain distributed ledger had been updated to reflect the transmission of the first portion of the finite divisible resource to the second user and the obligation of the second user to return the first portion to the first user.

2. The system of claim 1, wherein the processing device is further configured to execute the computer-readable program code to:
receive from a third user from among the plurality of users a request for the first portion of the finite divisible resource;
transmit to the block chain distributed ledger an indication that the third user has requested that the first portion of the divisible resource be assigned to the third user;
receive from the block chain distributed ledger an indication that the first portion of the divisible resource is unavailable to be assigned to the third user; and
reject the request from the third user for the first portion of the finite divisible resource.

3. The system of claim 2, wherein the processing device is further configured to execute the computer-readable program code to:
receive an indication that the first user has satisfied the obligation of the first user to return the first portion of the finite divisible resource to the entity;
receive a confirmation that the first portion of the finite divisible resource has been returned to the entity;
transmit to the block chain distributed ledger an indication that the first user has satisfied the obligation of the first user and that the first portion has been returned to the entity;
receive from the block chain distributed ledger an indication that the block chain distributed ledger has been updated to reflect the satisfaction of the obligation of the first user and the return of the first portion of the finite divisible resource to the entity; and
receive from the block chain distributed ledger an indication that the first portion of the finite divisible resource is available for redistribution.

4. The system of claim 1 wherein identifying a first portion of the divisible resource to be assigned to a first user from among the plurality of users comprises receiving an indication of authorization from a representative of the plurality of users.

5. A computer program product for validating a status of a distributed resource, the computer program product comprising at least one non-transitory computer-readable medium having computer-readable program code portions embodied therein, the computer-readable program code portions comprising:
an executable portion configured for recognizing a finite divisible resource associated with a plurality of users, wherein the finite divisible resource is a pool of loanable funds of an entity;
an executable portion configured for identifying a first portion of the divisible resource to be assigned to a first user from among the plurality of users;
an executable portion configured for transmitting to a block chain distributed ledger an indication that the first portion of the divisible resource is to be assigned to the first user;
an executable portion configured for receiving from the block chain distributed ledger an indication that the first portion of the divisible resource is available to be assigned to the first user;
an executable portion configured for transmitting to the first user the first portion of the finite divisible resource;
an executable portion configured for receiving from the first user documentation of an obligation of the first user to return the first portion of the finite divisible resource to the entity;

an executable portion configured for extracting data from the documentation;

an executable portion configured for identifying private information in the data extracted from the documentation;

an executable portion configured for associating one or more tokens with the private information;

an executable portion configured for storing the private information on a private block chain distributed ledger;

an executable portion configured for transmitting to the block chain distributed ledger a record associated with the first user, the first portion of the finite divisible resource, and the obligation of the first user to return the first portion to the entity, wherein the record includes the one or more tokens and does not include the private information;

an executable portion configured for validating, via one or more nodes of the block chain distributed ledger, the record associated with the first user, the first portion of the finite divisible resource, and the obligation of the first user to return the first portion to the entity;

an executable portion configured for receiving from the block chain distributed ledger an indication that the block chain distributed ledger had been updated to reflect the transmission of the first portion of the finite divisible resource to the first user and the obligation of the first user to return the first portion to the entity;

an executable portion configured for receiving an indication that the first user has assigned the first portion of the finite divisible resource to a second user from among the plurality of the users;

an executable portion configured for receiving an indication of an obligation of the second user to return the first portion of the finite divisible resource to the first user;

an executable portion configured for transmitting to the block chain distributed ledger a record associated with the second user, the first portion of the finite divisible resource, and the obligation of the second user to return the first portion to the first user;

an executable portion configured for validating, via the one or more nodes of the block chain distributed ledger, the record associated with the second user, the first portion of the finite divisible resource, and the obligation of the second user to return the first portion to the first user; and an executable portion configured for receiving from the block chain distributed ledger an indication that the block chain distributed ledger had been updated to reflect the transmission of the first portion of the finite divisible resource to the second user and the obligation of the second user to return the first portion to the first user.

6. The computer program product of claim 5, wherein the computer-readable program code portions further comprise:

an executable portion configured for receiving from a third user from among the plurality of users a request for the first portion of the finite divisible resource;

an executable portion configured for transmitting to the block chain distributed ledger an indication that the third user has requested that the first portion of the divisible resource be assigned to the third user;

an executable portion configured for receiving from the block chain distributed ledger an indication that the first portion of the divisible resource is unavailable to be assigned to the third user; and an executable portion configured for rejecting the request from the third user for the first portion of the finite divisible resource.

7. The computer program product of claim 6, wherein the computer-readable program code portions further comprise:

an executable portion configured for receiving an indication that the first user has satisfied the obligation of the first user to return the first portion of the finite divisible resource to the entity;

an executable portion configured for receiving a confirmation that the first portion of the finite divisible resource has been returned to the entity;

an executable portion configured for transmitting to the block chain distributed ledger an indication that the first user has satisfied the obligation of the first user and that the first portion has been returned to the entity;

an executable portion configured for receiving from the block chain distributed ledger an indication that the block chain distributed ledger has been updated to reflect the satisfaction of the obligation of the first user and the return of the first portion of the finite divisible resource to the entity; and an executable portion configured for receiving from the block chain distributed ledger an indication that the first portion of the finite divisible resource is available for redistribution.

8. The computer program product of claim 5 wherein identifying a first portion of the divisible resource to be assigned to a first user from among the plurality of users comprises receiving an indication of authorization from a representative of the plurality of users.

9. A computer-implemented method for tracking and validating multiple instance of a user, the method comprising:

providing a computing system comprising a computer processing device and a non-transitory computer readable medium, where the computer readable medium comprises configured computer program instruction code, such that when said instruction code is operated by said computer processing device, said computer processing device performs the following operations:

recognizing a finite divisible resource associated with a plurality of users, wherein the finite divisible resource is a pool of loanable funds of an entity;

identifying a first portion of the divisible resource to be assigned to a first user from among the plurality of users;

transmitting to a block chain distributed ledger an indication that the first portion of the divisible resource is to be assigned to the first user;

receiving from the block chain distributed ledger an indication that the first portion of the divisible resource is available to be assigned to the first user;

transmitting to the first user the first portion of the finite divisible resource;

receiving from the first user documentation of an obligation of the first user to return the first portion of the finite divisible resource to the entity;

extracting data from the documentation;

identifying private information in the data extracted from the documentation;

associating one or more tokens with the private information;

storing the private information on a private block chain distributed ledger;

transmitting to the block chain distributed ledger a record associated with the first user, the first portion of the finite divisible resource, and the obligation of the first user to return the first portion to the entity, wherein the record includes the one or more tokens and does not include the private information;

validating, via one or more nodes of the block chain distributed ledger, the record associated with the first user, the first portion of the finite divisible resource, and the obligation of the first user to return the first portion to the entity;

receiving from the block chain distributed ledger an indication that the block chain distributed ledger had been updated to reflect the transmission of the first portion of the finite divisible resource to the first user and the obligation of the first user to return the first portion to the entity receiving an indication that the first user has assigned the first portion of the finite divisible resource to a second user from among the plurality of the users;

receiving an indication of an obligation of the second user to return the first portion of the finite divisible resource to the first user;

transmitting to the block chain distributed ledger a record associated with the second user, the first portion of the finite divisible resource, and the obligation of the second user to return the first portion to the first user;

validating, via the one or more nodes of the block chain distributed ledger, the record associated with the second user, the first portion of the finite divisible resource, and the obligation of the second user to return the first portion to the first user; and receiving from the block chain distributed ledger an indication that the block chain distributed ledger had been updated to reflect the transmission of the first portion of the finite divisible resource to the second user and the obligation of the second user to return the first portion to the first user.

10. The computer-implemented method of claim 9, wherein the computer processing device further performs the following operations:

receiving from a third user from among the plurality of users a request for the first portion of the finite divisible resource;

transmitting to the block chain distributed ledger an indication that the third user has requested that the first portion of the divisible resource be assigned to the third user;

receiving from the block chain distributed ledger an indication that the first portion of the divisible resource is unavailable to be assigned to the third user; and rejecting the request from the third user for the first portion of the finite divisible resource.

11. The computer-implemented method of claim 10, wherein the computer processing device further performs the following operations:

receiving an indication that the first user has satisfied the obligation of the first user to return the first portion of the finite divisible resource to the entity;

receiving a confirmation that the first portion of the finite divisible resource has been returned to the entity;

transmitting to the block chain distributed ledger an indication that the first user has satisfied the obligation of the first user and that the first portion has been returned to the entity;

receiving from the block chain distributed ledger an indication that the block chain distributed ledger has been updated to reflect the satisfaction of the obligation of the first user and the return of the first portion of the finite divisible resource to the entity; and receiving from the block chain distributed ledger an indication that the first portion of the finite divisible resource is available for redistribution.

12. The computer-implemented method of claim 9, wherein identifying a first portion of the divisible resource to be assigned to a first user from among the plurality of users comprises receiving an indication of authorization from a representative of the plurality of users.

13. The computer-implemented method of claim 9, wherein the private information comprises a name of the first user.

14. The computer-implemented method of claim 9, wherein the private information comprises an account number.

15. The computer program product of claim 5, wherein the private information comprises a name of the first user.

16. The computer program product of claim 5, wherein the private information comprises an account number.

17. The system of claim 1, wherein the private information comprises a name of the first user.

18. The system of claim 1, wherein the private information comprises an account number.

* * * * *